Figure 1:
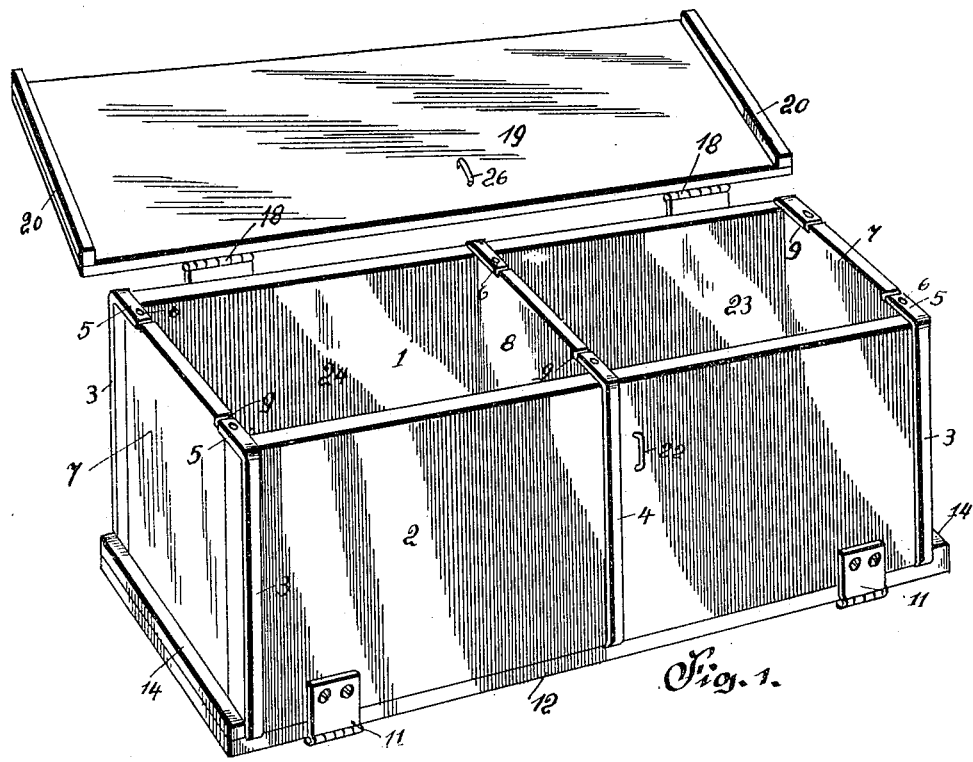

No. 807,907. PATENTED DEC. 19, 1905.
B. A. BOORE.
FOLDING BOX.
APPLICATION FILED MAR. 30, 1905.

Witnesses:
C. Klostermann
K. H. Butler

Inventor.
Burton A. Boore.
N. C. Everett Co.
by Attorneys.

UNITED STATES PATENT OFFICE.

BURTON A. BOORE, OF McKEESPORT, PENNSYLVANIA.

FOLDING BOX.

No. 807,907.  Specification of Letters Patent.  Patented Dec. 19, 1905.

Application filed March 30, 1905. Serial No. 252,859.

*To all whom it may concern:*

Be it known that I, BURTON A. BOORE, a citizen of the United States of America, residing at McKeesport, in the county of Allegheny and State of Pennsylvania, have invented certain new and useful Improvements in Folding Boxes, of which the following is a specification, reference being had therein to the accompanying drawings.

This invention relates to certain new and useful improvements in folding boxes, crates, and the like receptacles which are employed for transporting merchandise from one place to another.

The invention has for its object to provide a box or crate that can be readily folded to a compact form when empty, whereby it will occupy a comparatively small space when being returned to the original owner, which is the practice in connection with boxes and crates.

My invention aims to provide a box or crate particularly adapted for the transportation of fruit, such as berries, and creamery and poultry products, such as butter and eggs.

The construction of my improved box permits of egg-cartons being simultaneously folded with the box when the same is to be returned to the original owner in a knocked-down condition.

The invention further resides in the novel construction which I employ for producing a box or crate that will be extremely simple in construction, strong and durable, and comparatively inexpensive to manufacture.

With the above and other objects in view the invention finally consists in the novel construction, combination, and arrangement of parts, which will be hereinafter more fully described and then specifically pointed out in the claim, and referring to the drawings accompanying this application like numerals of reference designate corresponding parts throughout the several view, in which—

Figure 2:
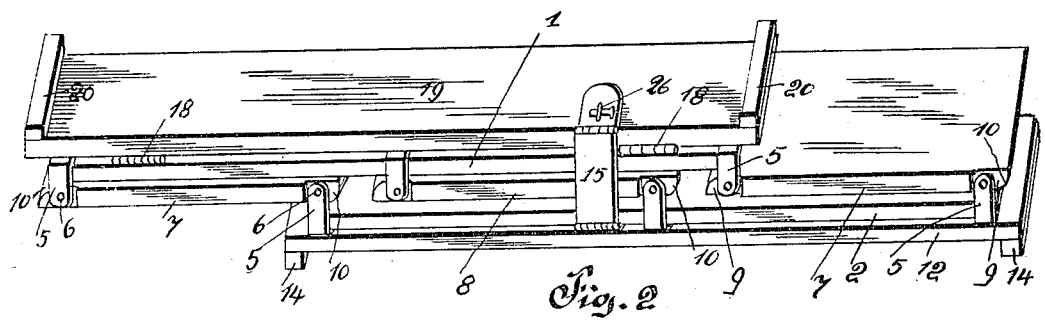
Figure 3:
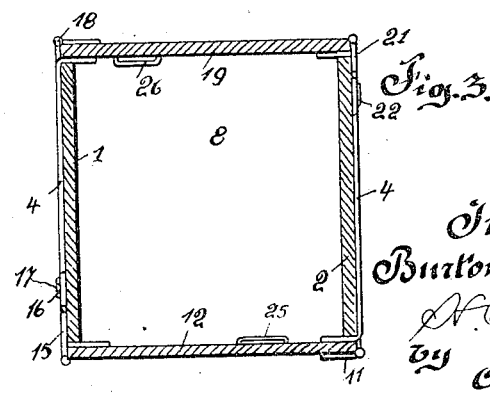

Figure 1 is a perspective view of my improved box or crate, illustrating one of the lids thereof in an open position. Fig. 2 is a perspective view of my improved box or crate in a folded or knocked-down position, and Fig. 3 is a transverse sectional view of my improved box or crate.

In the accompanying drawings I have illustrated the preferred manner of constructing my improved box or crate, and in the present illustration I have shown the box having solid walls, this type of box being particularly adapted for conveying merchandise wherein it is necessary to maintain a ventilation throughout the box. It is obvious, though, that the walls of the box can be readily formed of slats or provided with a plurality of openings, which will maintain a temperature within the box corresponding to that surrounding the box during its transportation. This form of box is particularly adapted for the transportation of fruit, creamery, and poultry products.

By referring to Figs. 1 and 2 of the drawings it will be observed that my improved box consists of the side walls 1 and 2, each of which is provided with a plurality of substantially U-shaped straps 3 3 and 4, the straps 3 3 being arranged and secured at the ends of the side walls, while the straps 4 4 are arranged centrally thereof. The ends 5 5 of each strap extend inwardly and are pierced, as indicated at 6, whereby the end walls 7 7 and the central partition 8 may be mounted between the inwardly-extending ends of the straps 3 and 4. The end walls 7 7 and the central partition 8 have their corners cut away, as indicated at 9, to accommodate the ends 5 of the straps, whereby a smooth and level edge will be formed around the top of the box. The vertical edges of the end walls 7 7 and the central partition 8 are beveled, as indicated at 10, to permit of the end walls 7 7 and the central partition 8 being folded upon the side walls 1 and 2, as illustrated in Fig. 2 of the drawings, the hinging of the end walls 7 7 and the central partition 8 permitting of these members being folded and lying in a plane horizontal with one another.

To form a top and bottom for my improved box, I have hinged, as indicated at 11 11, to the bottom edges of the side wall 2 a lid 12, the ends of the lid being provided with cleats 14 14, that are adapted to engage the lower edges of the end walls 7 7. The edge of the lid 12 opposite that which is hinged is provided with a suitable fastening means whereby the lid can be locked in engagement with the side wall 1. In the present illustration I have provided the lid 12 with a two-part hinged hasp 15, adapted to engage over a staple 16, secured in the side wall 1, contiguous to the lower edge thereof. A pin 17 or a lock may be employed for securing the lid 12 in engagement with the side wall 1.

The side wall 1 has hinged to its top edge, as indicated at 18 18, a lid 19, that is similar to the lid 12, heretofore described, being provided with cleats 20 20 and a hasp 21, adapted to engage over a staple 22, mounted adjacent to the top edge of the side wall 2.

It will be observed that the lid 12 and the lid 19 of my improved box can either form the bottom or the top of the box and that either the bottom or the top of the box can be opened when desired.

In Fig. 2 of the drawings I have illustrated the box in a knocked-down position and have shown the ordinary type of egg-cartons folded therein. In this connection it will be observed that the carton used in the compartment 23 is folded upon the central partition 8 and the side wall 2, while the carton used in the compartment 24 is folded upon the end wall 7 and between the central partition 8 and the side wall 2. This feature of my improved box enables me to return the cartons with the box, whereby they can be used several times for shipment purposes. When the box is in a folded position or knocked-down position, the lids 12 and 19 are folded rearwardly upon the side walls 1 and 2, and the hasps may be secured upon staples 25 and 26, secured in the under faces of the lids 12 and 19, adjacent to their hinged edges, this construction being shown in Fig. 2 of the drawings.

I may employ a plurality of partitions such as illustrated in Fig. 1 of the drawings, whereby the box can be divided off into a plurality of compartments, and I may also make various slight changes in the details of construction without departing from the general spirit and scope of the invention.

What I claim, and desire to secure by Letters Patent, is—

A folding box comprising side walls, end walls having the ends thereof cut away at each corner, straps embracing the side walls and having inturned ends pivoted in said cut-away corners of the end walls, a partition, having the ends cut away at each corner, intermediate straps embracing the side walls and having their inturned ends pivoted in said cut-away portions of the partition, the ends of said partition and the end walls being beveled intermediate the cut-away portions thereof, a lid hinged to one side wall, a separate lid hinged to the other side wall a two-part hinged hasp attached to one of said lids and adapted in the open position of the box to engage a staple carried by one of said side walls and in the closed position of the box to engage a staple carried by the other of said lids and means for securing said lids in the closed position.

In testimony whereof I affix my signature in the presence of two witnesses.

BURTON A. BOORE.

Witnesses:
H. C. EVERT,
E. E. POTTER.